(12) United States Patent
Nakashima et al.

(10) Patent No.: US 7,146,812 B2
(45) Date of Patent: *Dec. 12, 2006

(54) HYDRAULIC BRAKE APPARATUS

(75) Inventors: Nobuyuki Nakashima, Chiryu (JP); Atsushi Yasuda, Toyoake (JP)

(73) Assignee: Advics Co., Ltd., Kariya (JP)

( * ) Notice: Subject to any disclaimer, the term of this patent is extended or adjusted under 35 U.S.C. 154(b) by 23 days.

This patent is subject to a terminal disclaimer.

(21) Appl. No.: 10/733,333

(22) Filed: Dec. 12, 2003

(65) Prior Publication Data

US 2004/0123593 A1 Jul. 1, 2004

(30) Foreign Application Priority Data

Dec. 25, 2002 (JP) ............................. 2002-374042

(51) Int. Cl.
*B60T 13/12* (2006.01)
(52) U.S. Cl. .......................................... 60/562; 60/565
(58) Field of Classification Search ................. 60/562, 60/565
See application file for complete search history.

(56) References Cited

U.S. PATENT DOCUMENTS

| | | | | |
|---|---|---|---|---|
| 3,488,109 | A * | 1/1970 | Sperlich | 359/381 |
| 6,058,705 | A * | 5/2000 | Schunck | 60/562 |
| 6,192,685 | B1 * | 2/2001 | Bourlon et al. | 60/566 |
| 6,425,644 | B1 * | 7/2002 | Kawahata et al. | 303/122 |
| 6,464,307 | B1 * | 10/2002 | Yoshino | 303/11 |
| 6,554,089 | B1 * | 4/2003 | Sato et al. | 180/169 |
| 6,572,200 | B1 * | 6/2003 | Soga et al. | 303/3 |
| 6,808,238 | B1 * | 10/2004 | Drott et al. | 303/114.1 |

FOREIGN PATENT DOCUMENTS

| | | |
|---|---|---|
| DE | 196 51 153 A1 | 6/1998 |
| DE | 198 36 139 A1 | 3/1999 |
| DE | 199 10 618 A1 | 10/1999 |
| JP | 58-39551 A | 3/1983 |
| JP | 10-167042 | 6/1998 |
| JP | 2001-130400 A | 5/2001 |

OTHER PUBLICATIONS

Official Action issued by German Patent Office with English language translation.

* cited by examiner

*Primary Examiner*—Thomas E. Lazo
(74) *Attorney, Agent, or Firm*—Buchanan Ingersoll PC

(57) ABSTRACT

A hydraulic brake apparatus includes a tandem brake master cylinder having a rod piston moving in response to a brake pedal, and a floating piston moving in response to the rod piston; a separation valve provided in a hydraulic brake circuit connecting the brake master cylinder and brake wheel cylinders in order to establish and shut off communication between the brake master cylinder and the brake wheel cylinders; a pressure control valve unit for controlling fluid pressure to be supplied from an external fluid-pressure supply source to the brake wheel cylinders while the separation valve is in a shutoff condition; and a stroke simulator mechanism for allowing an idle stroke of the rod piston and an idle stroke of the floating piston while the separation valve is in the shutoff condition. The idle stroke of the floating piston starts during the idle stroke of the rod piston.

1 Claim, 2 Drawing Sheets

HYDRAULIC BRAKE APPARATUS

BACKGROUND OF THE INVENTION

1. Field of the Invention

The present invention relates to a hydraulic brake apparatus for use as, for example, a brake apparatus of a vehicle.

2. Description of the Related Art

A conventional hydraulic brake apparatus includes a tandem brake master cylinder having a rod piston and a floating piston, the rod piston moving in response to a brake-operating member such as a brake pedal, and the floating piston moving in response to the rod piston; a separation valve provided in a hydraulic brake circuit connecting the brake master cylinder and a brake wheel cylinder, the separation valve being able to establish and shut off communication between the brake master cylinder and the brake wheel cylinder; a pressure control valve unit for controlling fluid pressure to be supplied to the brake wheel cylinder from an external fluid-pressure supply source while the separation valve is in a shutoff condition; and a stroke simulator mechanism for allowing an idle stroke of the rod piston and an idle stroke of the floating piston while the separation valve is in the shutoff condition (during an idle stroke, no pressure is generated in the brake master cylinder) so as to ensure a stroke of the brake-operating member in accordance with an input load to the brake-operating member (see, for example, Japanese Patent Application Laid-Open (kokai) No. 10-167042).

The stroke simulator mechanism described in the above publication is set such that an idle stroke of the rod piston, which moves in response to the brake-operating member such as a brake pedal, and an idle stroke of the floating piston, which moves in response to the rod piston, can be performed sequentially and stepwise. Thus, upon completion of the idle stroke of the rod piston, the idle stroke of the floating piston may start. In this case, sliding resistance associated with start of the idle stroke of the floating piston may generate shock, thereby impairing an operator's feeling of operating the brake-operating member.

The stroke simulator mechanism appearing in the above publication is also set such that an idle stroke of a simulator piston can be performed subsequent to the idle stroke of the rod piston and the idle stroke of the floating piston, which moves in response to the rod piston. Thus, upon completion of an idle stroke of the floating piston, an idle stroke of the simulator piston may start. In this case, sliding resistance associated with start of an idle stroke of the simulator piston may generate shock, thereby impairing an operator's feeling of operating the brake-operating member.

SUMMARY OF THE INVENTION

An object of the present invention is to solve the above-mentioned problems in the conventional hydraulic brake apparatus and to provide a hydraulic brake apparatus which can reduce shock associated with start of movement of a floating piston or a simulator piston, to thereby improve an operator's feeling of operating a brake-operating member.

To achieve the above object, the present invention provides a hydraulic brake apparatus comprising a tandem brake master cylinder having a rod piston and a floating piston, the rod piston moving in response to a brake-operating member, and the floating piston moving in response to the rod piston; a separation valve provided in a hydraulic brake circuit connecting the brake master cylinder and a brake wheel cylinder, the separation valve being able to establish and shut off communication between the brake master cylinder and the brake wheel cylinder; a pressure control valve unit for controlling fluid pressure to be supplied from an external fluid-pressure supply source to the brake wheel cylinder while the separation valve is in a shutoff condition; and a stroke simulator mechanism for allowing an idle stroke of the rod piston and an idle stroke of the floating piston, while the separation valve is in the shutoff condition, so as to ensure a stroke of the brake-operating member in accordance with an input load to the brake-operating member. In the hydraulic brake apparatus, the idle stroke of the floating piston starts during the idle stroke of the rod piston.

Thus, in the hydraulic brake apparatus of the present invention, while the rod piston is performing a stroke, the floating piston starts its stroke. Therefore, when operation of the brake-operating member causes the stroke simulator mechanism to operate, shock associated with start of movement of the floating piston can be reduced, thereby improving an operator's feeling of operating the brake-operating member.

In the hydraulic brake apparatus of the present invention, preferably, the stroke simulator mechanism comprises a simulator piston, and the simulator piston starts its stroke after completion of the idle stroke of the floating piston and before or substantially upon completion of the idle stroke of the rod piston so as to ensure the stroke of the brake-operating member.

Thus, when operation of the brake-operating member causes the stroke simulator mechanism to operate, shock associated with start of movement of the floating piston and shock associated with start of movement of the simulator piston can be reduced, thereby improving an operator's feeling of operating the brake-operating member.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF PREFERRED EMBODIMENT

Figure 1:
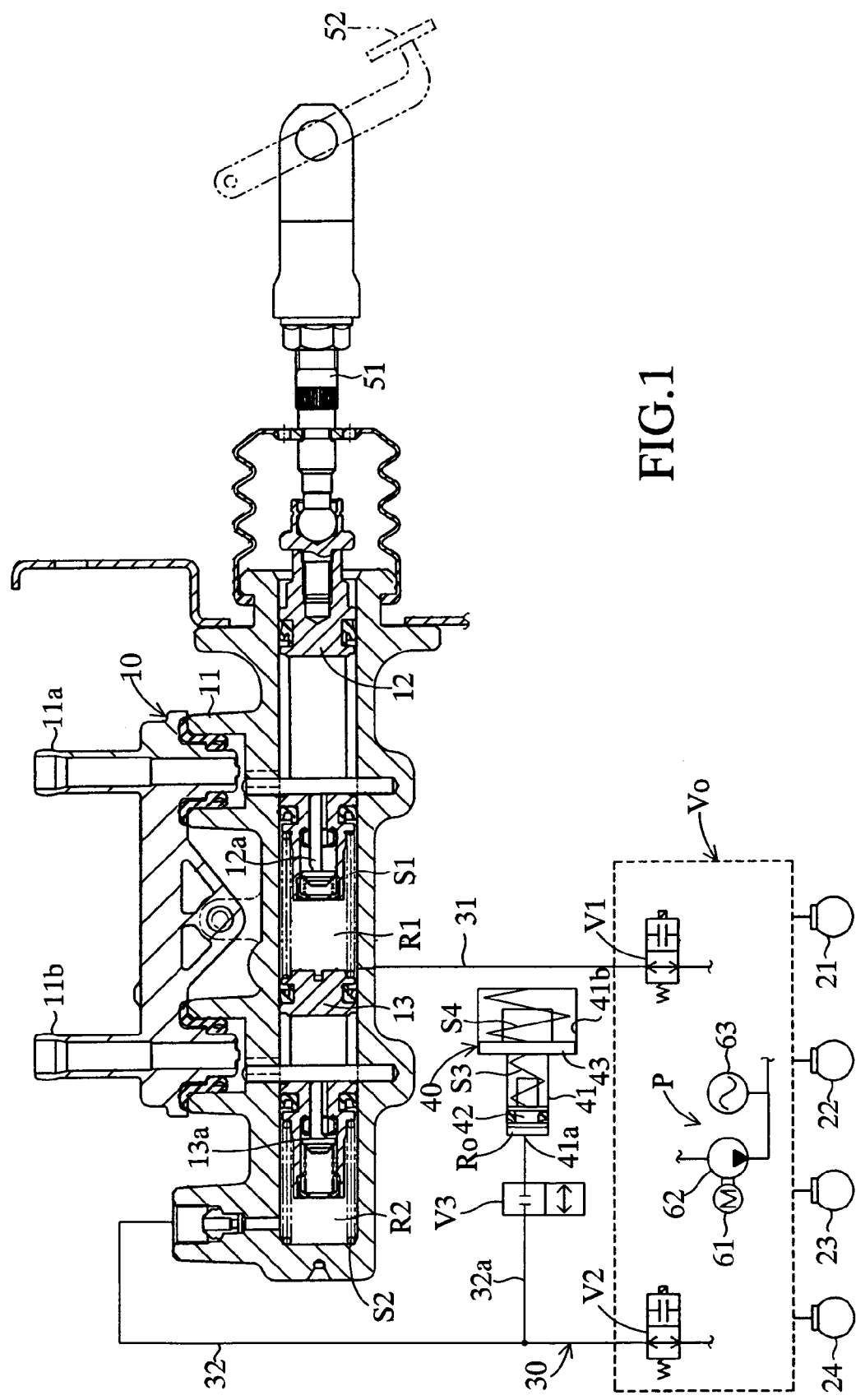
FIG. 1 is a schematic configuration view showing an embodiment of a hydraulic brake apparatus according to the present invention.

An embodiment of the present invention will next be described in detail with reference to the drawings. FIG. 1 schematically shows a hydraulic brake apparatus according to the embodiment. The hydraulic brake apparatus includes a tandem brake master cylinder 10; four brake wheel cylinders 21, 22, 23, and 24 for braking corresponding wheels; a two-system hydraulic brake circuit 30 (pipe lines 31 and 32) for connecting the brake master cylinder 10 and the brake wheel cylinders 21, 22, 23, and 24; a pair of separation valves V1 and V2; an external fluid-pressure supply source P; a pressure control valve unit Vo; an on-off valve V3; and a simulator cylinder 40.

The brake master cylinder 10 includes a cylinder body 11 having ports 11a and 11b to be connected to a reservoir (not shown) for storing a brake fluid; and a rod piston 12 and a floating piston 13, which are incorporated into the cylinder body 11 in a fluid-tight and axially slidable manner. Thus, the brake master cylinder 10 has a first pressure chamber R1 and a second pressure chamber R2 formed therein. The first pressure chamber R1 accommodates a compression coil spring S1 having a setting load (mounting load in the basic condition illustrated in FIG. 1) f1; and the second pressure chamber R2 accommodates a compression coil spring S2 having a setting load f2 (f2>f1). Notably, the rod piston 12 may be called a first piston, and the floating piston 13 may be called a second piston.

The rod piston 12 has an axial sliding resistance r1; is connected to a brake pedal 52, which serves as a brake-operating member, via a pedal rod 51; and can be mechanically pressed into the brake master cylinder 10 through an operator's stepping on the brake pedal 52. A plunger valve 12a is provided at a center portion of the rod piston 12. The plunger valve 12a opens and closes in accordance with a stroke; i.e., an axial movement, of the rod piston 12.

The plunger valve 12a is opened when the rod piston 12 is in the basic position illustrated in FIG. 1, thereby establishing communication between the first pressure chamber R1 and the reservoir. The plunger valve 12a is set to about 6 mm in its valve-opening stroke and is closed when the rod piston 12 performs a stroke not less than about 6 mm from its illustrated basic position. Thus, an idle stroke of the rod piston 12, during which no pressure is generated in the first pressure chamber R1, is about 6 mm.

The floating piston 13 has an axial sliding resistance r2. The spring force of the compression coil spring S1 and fluid pressure in the first pressure chamber R1—which vary with movement of the rod piston 12—press and cause the floating piston 13 to move against the spring force of the compression coil spring S2, which intervenes between the floating piston 13 and the cylinder body 11, and against fluid pressure in the second pressure chamber R2. A plunger valve 13a is provided at a center portion of the floating piston 13. The plunger valve 13a opens and closes in accordance with a stroke; i.e., an axial movement, of the floating piston 13.

The plunger valve 13a is opened when the floating piston 13 is in the basic position illustrated in FIG. 1, thereby establishing communication between the second pressure chamber R2 and the reservoir. The plunger valve 13a is set to about 1 mm in its valve-opening stroke and is closed when the floating piston 13 performs a stroke not less than about 1 mm from its illustrated basic position. Thus, an idle stroke of the floating piston 13, during which no pressure is generated in the second pressure chamber R2, is about 1 mm.

The separation valve V1 is a normally-open, 2-port, 2-position on-off valve. The separation valve V1 is provided in the pipe line 31, which connects the first pressure chamber R1 of the brake master cylinder 10 and both brake wheel cylinders 21 and 22, and can establish and shut off communication through the pipe line 31. An electric control unit (not shown) controls the on-off operation of the separation valve V1. The separation valve V2 is a normally-open, 2-port, 2-position on-off valve. The separation valve V2 is provided in the pipe line 32, which connects the second pressure chamber R2 of the brake master cylinder 10 and both brake wheel cylinders 23 and 24, and can establish and shut off communication through the pipe line 32. The electric control unit (not shown) controls the on-off operation of the separation valve V2.

The external fluid-pressure supply source P can supply fluid pressure to the brake wheel cylinders 21, 22, 23, and 24 via the pressure control valve unit Vo when both separation valves V1 and V2 are in the shutoff condition. The external fluid-pressure supply source P includes an electric motor 61, whose operation is controlled by the electric control unit (not shown); a pump 62 to be driven by the electric motor 61; and an accumulator 63 for storing pressurized fluid that is discharged from the pump 62.

The pressure control valve unit Vo has various control valves (not shown) for individually controlling fluid pressure that is supplied to the brake wheel cylinders 21, 22, 23, and 24 from the external fluid-pressure supply source P when the separation valves V1 and V2 are in the shutoff condition. The electric control unit (not shown) controls operation of these control valves, whereby ordinary brake control, antiskid control, or traction control is performed.

The on-off valve V3 is a normally-closed, 2-port, 2-position on-off valve. The on-off valve V3 is provided in a branch pipe line 32a, which branches off from the pipe line 32 connecting the second pressure chamber R2 of the brake master cylinder 10 and both brake wheel cylinders 23 and 24, and connects the pipe line 32 and the simulator cylinder 40. The on-off valve V3 can establish and shut off communication through the branch pipe line 32a. The electric control unit (not shown) causes the on-off valve V3 to open when both separation valves V1 and V2 are in the shutoff condition.

Figure 2:
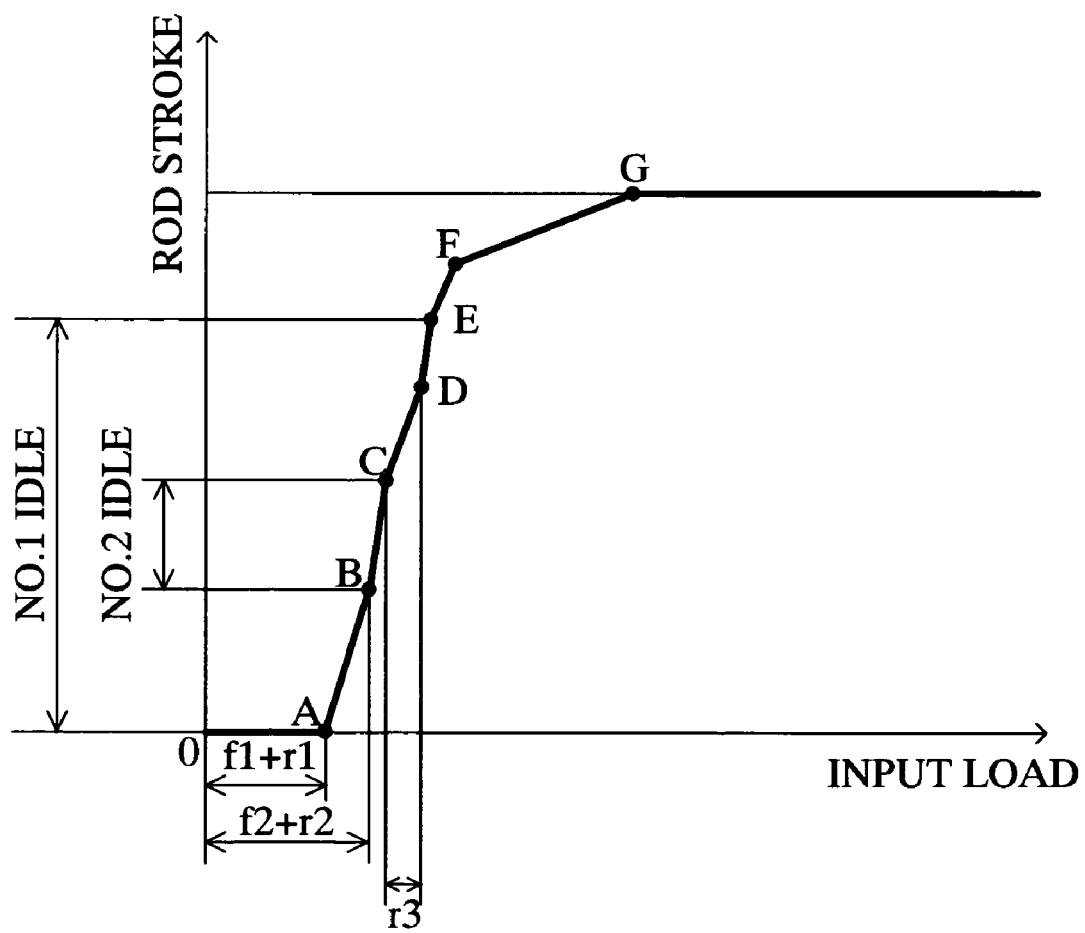
FIG. 2 is a diagram showing the relationship between input load and rod stroke during the course of operation of a stroke simulator mechanism of the hydraulic brake apparatus of FIG. 1.

The simulator cylinder 40, the compression coil springs S1 and S2 mounted in the brake master cylinder 10, and the on-off valve V3 provided in the branch line 32a constitute a stroke simulator mechanism. When both separation valves V1 and V2 are in the shutoff condition, and the on-off valve V3 is in the communication condition, the stroke simulator mechanism allows an idle stroke of the rod piston 12 and an idle stroke of the floating piston 13, thereby, as shown in FIG. 2, ensuring a stroke of the brake pedal 52 and a stroke of the pedal rod 51 (rod stroke) in accordance with an input load to the brake pedal 52.

The simulator cylinder 40 includes a cylinder body 41 having a port 41a and a stepped bore 41b, the port 41a communicating with the second pressure chamber R2 of the brake master cylinder 10 when the on-off valve V3 is open; a small-diameter piston 42, which is provided in a small-diameter portion of the stepped bore 41b of the cylinder body 41 in a fluid-tight, axially slidable condition, thereby defining, together with the small-diameter portion, a pressure chamber Ro into which the port 41a opens; a large-diameter piston 43, which is provided in a large-diameter portion of the stepped bore 41b of the cylinder body 41 in an axially slidable condition; a compression coil spring S3 having a setting load of about zero and intervening between the small-diameter piston 42 and the large-diameter piston 43; and a compression coil spring S4 having a setting load of about zero and intervening between the large-diameter piston 43 and the cylinder body 41.

The small-diameter piston 42 has an axial sliding resistance r3. Fluid pressure in the second pressure chamber R2 presses and causes the small-diameter piston 42 to move against the spring force of the compression coil spring S3, which intervenes between the small-diameter piston 42 and the large-diameter piston 43. The large-diameter piston 43 has an axial sliding resistance of about zero. The spring force of the compression coil spring S3, which intervenes between the small-diameter piston 42 and the large-diameter piston 43, or the small-diameter piston 42 causes the large-diameter piston 43 to move against the spring force of the compression coil spring S4, which intervenes between the large-diameter piston 43 and the cylinder body 41.

In the present embodiment, the above-described stroke simulator mechanism functions for establishing the following operation: an idle stroke (No. 2 idle) of the floating piston 13 starts and ends in the midst of an idle stroke (No. 1 idle) of the rod piston 12, and the small-diameter piston 42 of the simulator cylinder 40 starts its stroke after completion of an idle stroke (No. 2 idle) of the floating piston 13 and before completion of the idle stroke (No. 1 idle) of the rod piston 12, thereby ensuring a stroke of the brake pedal 52. Spring constants K1, K2, K3, and K4 of the compression coil springs S1, S2, S3, and S4, respectively, are set so as to satisfy the relationship K4>K1>K2>K3.

In the thus-configured embodiment, when the brake pedal 52 is stepped on, the electric control unit (not shown) brings both separation valves V1 and V2 into the shutoff condition and the on-off valve V3 into the communication condition; the compression coil springs S1, S2, S3, and S4 contract sequentially in accordance with an input load that is imposed on the pedal rod 51 from the brake pedal 52; and the pistons 12, 13, 42, and 43 perform respective strokes. Accordingly, the pedal rod 51 performs an axial stroke. Thus, as shown in FIG. 2, the stroke of the pedal rod 51 (rod stroke) increases with the input load that is imposed on the pedal rod 51 from the brake pedal 52.

Point A of FIG. 2 is the time when the input load reaches the sum (f1+r1) of the setting load f1 of the compression coil spring S1 and the sliding resistance r1 of the rod piston 12 and when the rod piston 12 in the basic position of FIG. 1 begins to move against the compression coil spring S1 and thus begins to contract the compression coil spring S1; i.e., the time when the idle stroke (No. 1 idle) of the rod piston 12 starts.

Point B of FIG. 2 is the time when the input load reaches the sum (f2+r2) of the setting load f2 of the compression coil spring S2 and the sliding resistance r2 of the floating piston 13 and when the floating piston 13 in the basic position of FIG. 1 begins to move against the compression coil spring S2 and thus begins to contract the compression coil spring S2; i.e., the time when the idle stroke (No. 2 idle) of the floating piston 13 starts. In the period of time between point A and point B of FIG. 2, only the rod piston 12 performs a stroke, so that the gradient of segment AB is substantially equal to the spring constant of the compression coil spring S1.

Point C of FIG. 2 is the time when the idle stroke (No. 2 idle) of the floating piston 13 becomes substantially 1 mm, and thus the plunger valve 13*a* is closed; i.e., the time when fluid pressure in the second pressure chamber R2 begins to increase and when the idle stroke (No. 2 idle) of the floating piston 13 ends. In the period of time between point B and point C of FIG. 2, the rod piston 12 and the floating piston 13 perform respective strokes, so that the gradient of segment BC is substantially equal to the combined spring constant of the compression coil springs S1 and S2.

Point D of FIG. 2 is the time when fluid pressure in the second pressure chamber R2; i.e., fluid pressure in the pressure chamber Ro of the simulator cylinder 40, reaches the sliding resistance r3 of the small-diameter piston 42 and when the small-diameter piston 42 in the basic position of FIG. 1 begins to move against the compression coil spring S3 and thus begins to contract the compression coil spring S3. In the period of time between point C and point D of FIG. 2, while the rod piston 12 performs a stroke, the floating piston 13 and the small-diameter piston 42 do not perform respective strokes, so that a section ranging from the second pressure chamber R2 to the pressure chamber Ro becomes a rigid body. Thus, the gradient of segment CD becomes substantially equal to the spring constant of the compression coil spring S1.

Point E of FIG. 2 is the time when the idle stroke (No. 1 idle) of the rod piston becomes substantially 6 mm, and thus the plunger valve 12*a* is closed; i.e., the time when fluid pressure in the first pressure chamber R1 begins to increase and when the idle stroke (No. 1 idle) of the rod piston 12 ends. In the period of time between point D and point E of FIG. 2, the rod piston 12, the floating piston 13, the small-diameter piston 42, and the large-diameter piston 43 perform respective strokes, so that the gradient of segment DE is substantially equal to the combined spring constant of the compression coil springs S1, S2, S3, and S4.

Point F of FIG. 2 is the time when the small-diameter piston 42 abuts the large-diameter piston 43. In the period of time between point E and point F of FIG. 2, while the rod piston 12, the floating piston 13, the small-diameter piston 42, and the large-diameter piston 43 perform respective strokes, the compression coil spring S1 does not contract, so that the gradient of segment EF becomes substantially equal to the combined spring constant of the compression coil springs S2, S3, and S4.

Point G of FIG. 2 is the time when the large-diameter piston 43 abuts the cylinder body 41 while the small-diameter piston 42 is in contact with the large-diameter piston 43 and when the function of the stroke simulator mechanism (the function of ensuring a stroke of the brake pedal 52) ends. In the period of time between point F and point G, while the rod piston 12, the floating piston 13, the small-diameter piston 42, and the large-diameter piston 43 perform respective strokes, the compression coil spring S1 does not contract, and the small-diameter piston 42 and the large-diameter piston 43 in contact with each other perform a stroke, so that the gradient of segment FG becomes substantially equal to the combined spring constant of the compression coil springs S2 and S4.

As is apparent from the above description, in the present embodiment, since the idle stroke (No. 2 idle) of the floating piston 13 starts in the midst of the idle stroke (No. 1 idle) of the rod piston 12, while the rod piston 12 is performing a stroke, the floating piston 13 starts its stroke. Thus, when stepping-on the brake pedal 52 causes the stroke simulator mechanism to operate, shock associated with start of movement of the floating piston 13 can be reduced, thereby improving an operator's feeling of operating the brake pedal 52.

Also, in the present embodiment, the small-diameter piston 42 of the simulator cylinder 40 starts its stroke after completion of the idle stroke (No. 2 idle) of the floating piston 13 and before completion of the idle stroke (No. 1 idle) of the rod piston 12 so as to ensure a stroke of the brake pedal 52. Thus, shock associated with start of movement of the small-diameter piston 42 of the simulator cylinder 40 can be reduced, thereby improving an operator's feeling of operating the brake pedal 52.

In the above-described embodiment, the simulator cylinder 40 includes a pair of pistons 42 and 43 and the compression coil springs S3 and S4. However, the number of pistons and compression coil springs of the simulator cylinder can be increased or decreased as appropriate. Also, in the above-described embodiment, the brake master cylinder 10 is of a center valve type in which the pistons 12 and 13 have the corresponding plunger valves 12*a* and 13*a* provided at the corresponding centers thereof. However, a master cylinder of another type; for example, a conventional master cylinder, may be employed.

In the above-described embodiment, the idle stroke (No. 2 idle) of the floating piston 13 starts and ends in the midst of the idle stroke (No. 1 idle) of the rod piston 12, and the small-diameter piston 42 of the simulator cylinder 40 starts its stroke after completion of the idle stroke (No. 2 idle) of the floating piston 13 and before completion of the idle stroke (No. 1 idle) of the rod piston 12. However, the present invention may be embodied in the following manner: the idle stroke (No. 2 idle) of the floating piston 13 starts in the midst of the idle stroke (No. 1 idle) of the rod piston 12, and the small-diameter piston 42 of the simulator cylinder 40 starts its stroke after completion of the idle stroke (No. 2 idle) of the floating piston 13 and substantially upon completion of the idle stroke (No. 1 idle) of the rod piston 12 (points D and E of FIG. 2 substantially coincide).

Obviously, numerous modifications and variations of the present invention are possible in light of the above teachings. It is therefore to be understood that within the scope of the appended claims, the present invention may be practiced otherwise than as specifically described herein.

What is claimed is:

1. A hydraulic brake apparatus comprising:
   a tandem brake master cylinder comprising:
      a cylinder body;
      a rod piston moving in response to a brake-operating member, the rod piston defining within the cylinder body a first reservoir pressure chamber in communication with a reservoir and a first pressure chamber in communication with a hydraulic brake circuit connecting the tandem brake master cylinder with a brake wheel cylinder, the rod piston having a first valve which is adapted to establish and shut off communication between the first pressure chamber and the first reservoir pressure chamber, the rod piston being capable of an idle stroke while the first valve is in an establishing condition in which the first valve establishes the communication between the first pressure chamber and the first reservoir pressure chamber; and
      a floating piston moving in response to the rod piston, the floating piston defining within the cylinder body a second reservoir pressure chamber in communication with the reservoir and a second pressure chamber in communication with the hydraulic brake circuit, the floating piston having a second valve which is adapted to establish and shut off communication between the second pressure chamber and the second reservoir pressure chamber, the floating piston being capable of an idle stroke while the second valve is in an establishing condition in which the second valve establishes the communication between the second pressure chamber and the second reservoir pressure chamber,
   a separation valve provided in the hydraulic brake circuit and adapted to establish and shut off communication between the tandem brake master cylinder and the brake wheel cylinder;
   a pressure control valve unit for controlling fluid pressure to be supplied from an external fluid-pressure supply source to the brake wheel cylinder while the separation valve is in a shut off condition;
   a stroke simulator mechanism for ensuring a stroke of the brake-operating member in accordance with an input load to the brake-operating member, while the separation valve is in the shut off condition, by allowing a stroke of the rod piston and a stroke of the floating piston, the stroke simulator mechanism comprising a simulator piston which is caused to move by fluid pressure in the second pressure chamber,
   wherein the idle stroke of the floating piston starts and ends during the idle stroke of the rod piston, and the simulator piston starts its stroke after completion of the idle stroke of the floating piston and before or upon completion of the idle stroke of the rod piston to ensure the stroke of the brake-operating member.

* * * * *